(12) United States Patent
Skaria et al.

(10) Patent No.: US 8,429,753 B2
(45) Date of Patent: Apr. 23, 2013

(54) CONTROLLING ACCESS TO DOCUMENTS USING FILE LOCKS

(75) Inventors: Simon Skaria, Sammamish, WA (US); Naresh Kannan, Seattle, WA (US); Simon Peter Clarke, Seattle, WA (US); Miko Arnab Sakhya Singha Bose, Seattle, WA (US); Christopher J. Antos, Bellevue, WA (US); Mark Rolland Knight, Bellevue, WA (US); Andrew G. Carlson, Redmond, WA (US); Don Adam Hedgpeth, Redmond, WA (US); Mitesh Pankaj Patel, Seattle, WA (US); Andrew Sean Watson, Seattle, WA (US); Jonathan B. Bailor, Bellevue, WA (US); Elena Petrova, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 12/117,040

(22) Filed: May 8, 2008

(65) Prior Publication Data
US 2009/0282462 A1    Nov. 12, 2009

(51) Int. Cl.
*G06F 21/00*    (2006.01)
(52) U.S. Cl.
USPC ............... 726/27; 726/26; 726/28; 726/29; 726/30; 713/165; 713/166; 713/167; 713/168; 713/182; 713/183; 713/184; 713/185; 713/186; 709/225; 709/229
(58) Field of Classification Search .......... 713/182–186, 713/165–168; 709/225, 229; 726/26–30
See application file for complete search history.

(56) References Cited

U.S. PATENT DOCUMENTS

| 4,855,580 A | | 8/1989 | Van Maanen, Jr. | |
| 5,107,443 A | * | 4/1992 | Smith et al. | ............ 715/751 |

(Continued)

FOREIGN PATENT DOCUMENTS

| CN | 1276568 A | 12/2000 |
| CN | 1804836 | 7/2006 |

(Continued)

OTHER PUBLICATIONS

Shiro Sakata, Development and Evaluation of an in-house Multimedia Desktop Conference System, Apr. 1990, IEEE Journal on selected areas in communications, vol. 8.*

(Continued)

*Primary Examiner* — Taghi Arani
*Assistant Examiner* — Josnel Jeudy
(74) *Attorney, Agent, or Firm* — Merchant & Gould P.C.

(57) ABSTRACT

Examples are related to systems and methods for controlling access to document files on a document server. One example system includes document files stored on a document server, at least one of the document files referencing a file lock, and a document access processing module. The example document access processing module includes a file sharing processing module that determines a coauthoring status of a software application of a client computer requesting access to the document file, and a file lock processing module that stores one or more file locks and that controls the setting and resetting of file locks. The example document access processing module uses the coauthoring status of the software application and the file lock status of a document file to determine whether a software application is permitted to have write access to the document file.

19 Claims, 6 Drawing Sheets

U.S. PATENT DOCUMENTS

| | | | |
|---|---|---|---|
| 5,142,619 A | 8/1992 | Webster, III | |
| 5,313,394 A | 5/1994 | Clapp | |
| 5,339,389 A | 8/1994 | Bates et al. | |
| 5,446,842 A | 8/1995 | Schaeffer | |
| 5,486,686 A | 1/1996 | Zdybel | |
| 5,535,332 A | 7/1996 | Ishida | |
| 5,568,640 A | 10/1996 | Nishiyama et al. | |
| 5,623,659 A | 4/1997 | Shi et al. | |
| 5,630,138 A | 5/1997 | Raman | |
| 5,664,186 A | 9/1997 | Bennett et al. | |
| 5,671,428 A * | 9/1997 | Muranaga et al. | 715/751 |
| 5,692,178 A | 11/1997 | Shaughnessy | |
| 5,729,734 A | 3/1998 | Parker et al. | |
| 5,751,958 A | 5/1998 | Zweben | |
| 5,781,732 A | 7/1998 | Adams | |
| 5,781,908 A | 7/1998 | Williams et al. | |
| 5,787,262 A | 7/1998 | Shakib et al. | |
| 5,835,950 A | 11/1998 | Cho et al. | |
| 5,963,931 A | 10/1999 | Fagg | |
| 6,000,945 A | 12/1999 | Sanchez-Lazer | |
| 6,006,239 A | 12/1999 | Bhansali et al. | |
| 6,026,461 A | 2/2000 | Baxter et al. | |
| 6,055,546 A | 4/2000 | Pongracz et al. | |
| 6,065,026 A | 5/2000 | Cornelia | |
| 6,067,551 A | 5/2000 | Brown et al. | |
| 6,073,161 A | 6/2000 | DeBoskey et al. | |
| 6,088,702 A | 7/2000 | Plantz | |
| 6,202,085 B1 | 3/2001 | Benson et al. | |
| 6,209,010 B1 | 3/2001 | Gauthier | |
| 6,209,128 B1 | 3/2001 | Gerard et al. | |
| 6,240,414 B1 | 5/2001 | Beizer et al. | |
| 6,244,575 B1 | 6/2001 | Vaartstra et al. | |
| 6,275,935 B1 | 8/2001 | Barlow | |
| 6,317,777 B1 | 11/2001 | Skarbo et al. | |
| 6,324,544 B1 | 11/2001 | Alam et al. | |
| 6,327,584 B1 | 12/2001 | Xian et al. | |
| 6,327,611 B1 | 12/2001 | Everingham | |
| 6,341,291 B1 | 1/2002 | Bentley et al. | |
| 6,342,906 B1 | 1/2002 | Kumar et al. | |
| 6,411,965 B2 | 6/2002 | Klug | |
| 6,430,576 B1 | 8/2002 | Gates et al. | |
| 6,438,548 B1 | 8/2002 | Grim, III et al. | |
| 6,438,563 B1 | 8/2002 | Kawagoe | |
| 6,438,564 B1 | 8/2002 | Morton et al. | |
| 6,446,093 B2 | 9/2002 | Tabuchi | |
| 6,502,113 B1 | 12/2002 | Crawford et al. | |
| 6,526,434 B1 | 2/2003 | Carlson et al. | |
| 6,529,905 B1 | 3/2003 | Bray et al. | |
| 6,560,614 B1 | 5/2003 | Barboy et al. | |
| 6,560,620 B1 | 5/2003 | Ching | |
| 6,574,377 B1 | 6/2003 | Cahill et al. | |
| 6,610,104 B1 | 8/2003 | Lin | |
| 6,662,209 B2 | 12/2003 | Potts, Jr. et al. | |
| 6,681,371 B1 | 1/2004 | Devanbu | |
| 6,681,382 B1 | 1/2004 | Kakumani | |
| 6,687,878 B1 | 2/2004 | Eintracht et al. | |
| 6,711,718 B2 | 3/2004 | Pfeil et al. | |
| 6,751,618 B1 | 6/2004 | Germscheid et al. | |
| 6,757,678 B2 | 6/2004 | Myllymaki | |
| 6,757,696 B2 | 6/2004 | Multer et al. | |
| 6,757,767 B1 | 6/2004 | Kelleher | |
| 6,757,871 B1 | 6/2004 | Sato et al. | |
| 6,760,840 B1 | 7/2004 | Shimbo et al. | |
| 6,772,165 B2 | 8/2004 | O'Carroll | |
| 6,842,768 B1 | 1/2005 | Shaffer et al. | |
| 6,854,087 B1 * | 2/2005 | Takeo et al. | 715/203 |
| 6,925,476 B1 | 8/2005 | Multer | |
| 6,976,213 B1 | 12/2005 | Letourneau et al. | |
| 6,983,416 B1 | 1/2006 | Bae | |
| 6,993,522 B2 | 1/2006 | Chen et al. | |
| 7,007,235 B1 * | 2/2006 | Hussein et al. | 715/751 |
| 7,024,429 B2 | 4/2006 | Ngo et al. | |
| 7,024,430 B1 | 4/2006 | Ingraham et al. | |
| 7,035,839 B1 | 4/2006 | Gillespie et al. | |
| 7,039,679 B2 | 5/2006 | Mendez et al. | |
| 7,047,407 B2 * | 5/2006 | Itoh et al. | 713/168 |
| 7,053,839 B2 | 5/2006 | Cassel et al. | |
| 7,058,663 B2 | 6/2006 | Johnston et al. | |
| 7,065,633 B1 | 6/2006 | Yates et al. | |
| 7,069,505 B2 | 6/2006 | Tamano | |
| 7,089,278 B1 | 8/2006 | Churchill et al. | |
| 7,110,936 B2 | 9/2006 | Hiew | |
| 7,111,237 B2 | 9/2006 | Chan | |
| 7,117,278 B2 | 10/2006 | Avery | |
| 7,124,151 B1 | 10/2006 | Choi | |
| 7,124,362 B2 | 10/2006 | Tischer | |
| 7,127,501 B1 | 10/2006 | Beir et al. | |
| 7,149,776 B1 | 12/2006 | Roy et al. | |
| 7,155,465 B2 | 12/2006 | Lee et al. | |
| 7,185,277 B1 | 2/2007 | Bernstein et al. | |
| 7,200,668 B2 | 4/2007 | Mak et al. | |
| 7,203,708 B2 | 4/2007 | Liu et al. | |
| 7,209,948 B2 | 4/2007 | Srinivasa | |
| 7,225,189 B1 | 5/2007 | McCormack et al. | |
| 7,240,091 B1 | 7/2007 | Hopmann et al. | |
| 7,249,314 B2 * | 7/2007 | Walker et al. | 715/205 |
| 7,293,049 B2 | 11/2007 | Kadyk et al. | |
| 7,310,657 B2 | 12/2007 | Nakamura | |
| 7,315,978 B2 | 1/2008 | Giles et al. | |
| 7,328,243 B2 | 2/2008 | Yeager et al. | |
| 7,346,705 B2 | 3/2008 | Hullot et al. | |
| 7,401,291 B2 | 7/2008 | Ramaley et al. | |
| 7,496,577 B2 | 2/2009 | Williamson | |
| 7,529,780 B1 | 5/2009 | Braginsky et al. | |
| 7,536,641 B2 | 5/2009 | Rosenstein et al. | |
| 7,565,603 B1 | 7/2009 | Jones et al. | |
| 7,577,906 B2 | 8/2009 | Friedrichowitz | |
| 7,594,163 B2 | 9/2009 | Slack-Smith | |
| 7,603,357 B1 | 10/2009 | Gourdol | |
| 7,610,287 B1 | 10/2009 | Dean et al. | |
| 7,647,292 B2 | 1/2010 | Hayashi | |
| 7,650,336 B1 | 1/2010 | Herrmann | |
| 7,664,750 B2 | 2/2010 | Frees | |
| 7,694,217 B2 | 4/2010 | Croft | |
| 7,714,222 B2 | 5/2010 | Taub | |
| 7,761,784 B2 | 7/2010 | Parks et al. | |
| 7,779,347 B2 | 8/2010 | Christiansen et al. | |
| 7,788,326 B2 | 8/2010 | Buchheit et al. | |
| 7,792,788 B2 | 9/2010 | Melmon | |
| 7,801,951 B2 | 9/2010 | Fishkin et al. | |
| 7,839,532 B2 | 11/2010 | Brawn et al. | |
| 7,912,811 B2 | 3/2011 | Hodel-Widmer | |
| 7,941,399 B2 | 5/2011 | Bailor | |
| 7,962,853 B2 | 6/2011 | Bedi et al. | |
| 7,966,556 B1 | 6/2011 | Bourdev | |
| 8,019,780 B1 | 9/2011 | Pinkerton et al. | |
| 8,028,229 B2 | 9/2011 | Bailor et al. | |
| 8,082,277 B1 | 12/2011 | O'Brien et al. | |
| 2001/0018697 A1 | 8/2001 | Kunitake et al. | |
| 2001/0042075 A1 | 11/2001 | Tabuchi | |
| 2002/0007287 A1 | 1/2002 | Straube et al. | |
| 2002/0065848 A1 | 5/2002 | Walker et al. | |
| 2002/0069192 A1 | 6/2002 | Aegerter | |
| 2002/0188598 A1 | 12/2002 | Myllymaki | |
| 2003/0028600 A1 | 2/2003 | Parker | |
| 2003/0093760 A1 | 5/2003 | Suzuki et al. | |
| 2003/0097410 A1 | 5/2003 | Atkins et al. | |
| 2003/0097638 A1 | 5/2003 | Tamano | |
| 2003/0115481 A1 * | 6/2003 | Baird et al. | 713/201 |
| 2003/0140067 A1 | 7/2003 | Sesek et al. | |
| 2003/0159105 A1 | 8/2003 | Hiebert | |
| 2003/0167281 A1 | 9/2003 | Cohen et al. | |
| 2003/0172113 A1 | 9/2003 | Cameron et al. | |
| 2003/0172168 A1 | 9/2003 | Mak et al. | |
| 2003/0208534 A1 | 11/2003 | Carmichael | |
| 2004/0039829 A1 | 2/2004 | Bucher | |
| 2004/0068505 A1 | 4/2004 | Lee et al. | |
| 2004/0107224 A1 | 6/2004 | Bera | |
| 2004/0122870 A1 | 6/2004 | Park et al. | |
| 2004/0122898 A1 | 6/2004 | Srinivasa | |
| 2004/0122912 A1 | 6/2004 | Kim et al. | |
| 2004/0133858 A1 | 7/2004 | Barnett | |
| 2004/0143630 A1 | 7/2004 | Kaufmann et al. | |
| 2004/0172395 A1 | 9/2004 | Edelstein et al. | |
| 2004/0177343 A1 | 9/2004 | McVoy et al. | |
| 2004/0199550 A1 | 10/2004 | Ito et al. | |
| 2004/0205539 A1 | 10/2004 | Mak et al. | |

| | | |
|---|---|---|
| 2004/0205653 A1 | 10/2004 | Hadfield et al. |
| 2004/0230903 A1 | 11/2004 | Elza et al. |
| 2004/0239700 A1 | 12/2004 | Baschy |
| 2004/0243644 A1 | 12/2004 | Steere et al. |
| 2005/0004990 A1 | 1/2005 | Durazo |
| 2005/0022122 A1 | 1/2005 | Barrus et al. |
| 2005/0033811 A1 | 2/2005 | Bhogal et al. |
| 2005/0064858 A1 | 3/2005 | Makela et al. |
| 2005/0071386 A1 | 3/2005 | Wolfgang |
| 2005/0097440 A1* | 5/2005 | Lusk et al. ............... 715/500.1 |
| 2005/0177617 A1 | 8/2005 | Banginwar et al. |
| 2005/0198132 A1 | 9/2005 | Vellante et al. |
| 2005/0203962 A1 | 9/2005 | Zhou et al. |
| 2005/0216524 A1 | 9/2005 | Gomes et al. |
| 2005/0223066 A1 | 10/2005 | Buchheit et al. |
| 2005/0234943 A1 | 10/2005 | Clarke |
| 2005/0240858 A1 | 10/2005 | Croft et al. |
| 2005/0251738 A1 | 11/2005 | Hirano et al. |
| 2005/0256907 A1 | 11/2005 | Novik et al. |
| 2005/0262203 A1 | 11/2005 | Buchheit et al. |
| 2005/0289512 A1 | 12/2005 | Matsusaka |
| 2006/0015539 A1 | 1/2006 | Wolf et al. |
| 2006/0015811 A1 | 1/2006 | Tanaka et al. |
| 2006/0020360 A1 | 1/2006 | Wu |
| 2006/0031264 A1 | 2/2006 | Bosworth et al. |
| 2006/0041579 A1 | 2/2006 | Miyashita et al. |
| 2006/0041596 A1 | 2/2006 | Stirbu et al. |
| 2006/0047656 A1 | 3/2006 | Dehlinger et al. |
| 2006/0053194 A1 | 3/2006 | Schneider |
| 2006/0053195 A1* | 3/2006 | Schneider et al. ............ 709/204 |
| 2006/0080432 A1 | 4/2006 | Spataro et al. |
| 2006/0085402 A1 | 4/2006 | Brown et al. |
| 2006/0101328 A1 | 5/2006 | Albornoz |
| 2006/0106879 A1 | 5/2006 | Zondervan et al. |
| 2006/0123033 A1 | 6/2006 | Livshits |
| 2006/0136511 A1 | 6/2006 | Ngo et al. |
| 2006/0136809 A1 | 6/2006 | Fernstrom |
| 2006/0200755 A1 | 9/2006 | Melmon et al. |
| 2006/0218476 A1 | 9/2006 | Gombert |
| 2006/0242549 A1 | 10/2006 | Schwier et al. |
| 2006/0248038 A1 | 11/2006 | Kaplan et al. |
| 2006/0259524 A1 | 11/2006 | Horton |
| 2006/0265377 A1 | 11/2006 | Raman et al. |
| 2007/0016650 A1 | 1/2007 | Gilbert et al. |
| 2007/0066293 A1 | 3/2007 | Peng |
| 2007/0118598 A1* | 5/2007 | Bedi et al. ............... 709/204 |
| 2007/0118794 A1 | 5/2007 | Hollander et al. |
| 2007/0130334 A1 | 6/2007 | Carley |
| 2007/0156672 A1 | 7/2007 | Wolff et al. |
| 2007/0186157 A1 | 8/2007 | Walker et al. |
| 2007/0186171 A1 | 8/2007 | Junuzovic et al. |
| 2007/0198952 A1 | 8/2007 | Pittenger |
| 2007/0203917 A1 | 8/2007 | Du et al. |
| 2007/0226320 A1 | 9/2007 | Hager et al. |
| 2007/0226604 A1 | 9/2007 | Chalasani et al. |
| 2007/0283321 A1 | 12/2007 | Hegde |
| 2008/0028300 A1 | 1/2008 | Krieger et al. |
| 2008/0052634 A1 | 2/2008 | Fishkin et al. |
| 2008/0059187 A1 | 3/2008 | Roitblat et al. |
| 2008/0059539 A1 | 3/2008 | Chin et al. |
| 2008/0086718 A1 | 4/2008 | Bostic |
| 2008/0097993 A1 | 4/2008 | Nanba |
| 2008/0098294 A1 | 4/2008 | Le |
| 2008/0114740 A1 | 5/2008 | Vergottini |
| 2008/0126953 A1 | 5/2008 | Davidson et al. |
| 2008/0147590 A1 | 6/2008 | Bechtel et al. |
| 2008/0177782 A1 | 7/2008 | Poston |
| 2008/0180740 A1 | 7/2008 | Kimura et al. |
| 2008/0235579 A1 | 9/2008 | Champion et al. |
| 2008/0256113 A1 | 10/2008 | Rasmussen et al. |
| 2008/0256114 A1 | 10/2008 | Rasmussen et al. |
| 2008/0263032 A1 | 10/2008 | Vailaya et al. |
| 2008/0270386 A1 | 10/2008 | Ohi et al. |
| 2008/0294895 A1 | 11/2008 | Bodner et al. |
| 2008/0320384 A1 | 12/2008 | Nagarajan |
| 2009/0006936 A1 | 1/2009 | Parker |
| 2009/0006946 A1 | 1/2009 | Hanson |
| 2009/0006948 A1 | 1/2009 | Parker |
| 2009/0063489 A1 | 3/2009 | Neumann et al. |
| 2009/0094231 A1 | 4/2009 | Marvit et al. |
| 2009/0094242 A1 | 4/2009 | Lo et al. |
| 2009/0125518 A1 | 5/2009 | Bailor et al. |
| 2009/0157811 A1 | 6/2009 | Bailor et al. |
| 2009/0171987 A1 | 7/2009 | Coppinger et al. |
| 2009/0193331 A1 | 7/2009 | Croft et al. |
| 2009/0228473 A1 | 9/2009 | Kannan et al. |
| 2009/0235158 A1 | 9/2009 | Rosenstein et al. |
| 2009/0249224 A1 | 10/2009 | Davis et al. |
| 2009/0271696 A1 | 10/2009 | Bailor et al. |
| 2009/0282041 A1 | 11/2009 | Skaria et al. |
| 2009/0327294 A1 | 12/2009 | Bailor |
| 2010/0023562 A1 | 1/2010 | Kreuch et al. |
| 2010/0070464 A1 | 3/2010 | Aymeloglu et al. |
| 2010/0088676 A1 | 4/2010 | Yuan |
| 2010/0095198 A1 | 4/2010 | Bultrowicz et al. |
| 2010/0131836 A1 | 5/2010 | Dukhon et al. |
| 2010/0278453 A1 | 11/2010 | King |
| 2010/0281074 A1 | 11/2010 | Bailor et al. |
| 2011/0055702 A1 | 3/2011 | Jakobson |
| 2011/0184906 A1 | 7/2011 | Bailor et al. |
| 2012/0254315 A1 | 10/2012 | Skaria et al. |
| 2012/0278276 A1 | 11/2012 | Bailor et al. |
| 2013/0013997 A1 | 1/2013 | Bailor et al. |

FOREIGN PATENT DOCUMENTS

| | | |
|---|---|---|
| CN | 101042702 | 9/2007 |
| DE | 19844071 A1 | 4/1999 |
| EP | 1132847 A2 | 9/2001 |
| EP | 1290575 | 6/2005 |
| EP | 1681652 A2 | 7/2006 |
| JP | 2000259623 | 9/2000 |
| JP | 2002288029 | 10/2002 |
| JP | 2005267021 | 9/2005 |
| JP | 2005310158 A | 11/2005 |
| JP | 2007115131 | 5/2007 |
| JP | 2008210192 | 9/2008 |
| JP | 20099410 | 1/2009 |
| KR | 10-0331685 B1 | 4/2002 |
| KR | 10-2006-0047218 A | 5/2006 |
| RU | 2250492 C2 | 4/2005 |
| RU | 50695 U1 | 1/2006 |
| TW | 200424868 | 11/2004 |
| TW | 200627259 | 8/2006 |
| WO | WO 01/25986 | 4/2001 |
| WO | WO 01/33362 A1 | 5/2001 |
| WO | WO 01/88750 | 11/2001 |
| WO | WO 02/33575 | 4/2002 |
| WO | WO 03/058374 | 7/2003 |
| WO | WO 2005/114467 A2 | 12/2005 |
| WO | WO 2007/034858 A1 | 3/2007 |
| WO | WO 2007/062949 | 6/2007 |
| WO | WO 2009/061638 | 5/2009 |
| WO | WO 2009/076010 | 6/2009 |
| WO | WO 2009/079116 | 6/2009 |
| WO | WO 2009/134548 | 11/2009 |
| WO | WO 2009/154842 | 12/2009 |
| WO | WO 2009/158108 | 12/2009 |

OTHER PUBLICATIONS

Shiro Sakata, Development and Evaluation of an in-House Multimedia Desktop Conference System, Apr. 1990, vol. 8.*

Shiro Sakata, NPL document, "Development and Evaluation of an in-House Multimedia Desktop Conference System", IEEE Journal on Selected Areas in communications, vol. 8, Apr. 1990.*

Shiro Sakata, Development and Evaluation of an in-house Multimedia Desktop Conference System, IEEE Journal on Selected Areas in Communications, vol. 8, Apr. 1990.*

Bellagio, David et al., "Software Configuration Management Strategies and IBM Rational ClearCase A Practical Introduction, Second Edition" In: "Software Configuration Management Strategies and IBM Rational ClearCase A Practical Introduction, Second Edition", May 23, 2005, IBM Press, XP55009093, ISBN: 978-0-32-120019-8 pp. 173-178.

Chinese Office Action in Application 200880115943.1, mailed Oct. 25, 2011, 13 pgs.

Chinese Office Action in Application 200880119647.9, mailed Nov. 24, 2011, 7 pgs.

European Extended Search Report in EP Application 09739350.8, mailed Nov. 9, 2011, 10 pgs.
US Notice of Allowance for U.S. Appl. No. 12/117,025, mailed Dec. 28, 2011, 11 pgs.
U.S. Appl. No. 12/111,174, Office Action mailed Nov. 21, 2011, 20 pgs.
U.S. Appl. No. 12/276,874, Office Action mailed Oct. 26, 2011, 18 pgs.
U.S. Appl. No. 13/079,605, Office Action mailed Dec. 5, 2011, 31 pgs.
U.S. Appl. No. 11/957,010, Amendment and Response filed Nov. 16, 2011, 12 pgs.
U.S. Appl. No. 12/044,744, Amendment and Response filed Nov. 30, 2011, 12 pgs.
U.S. Appl. No. 12/145,536, Amendment and Response filed Nov. 30, 2011, 20 pgs.
International Search Report and Written Opinion for PCT/US2008/081456 / MS 321449.02 mailed Mar. 31, 2009.
US Office Action (Non-Final) for U.S. Appl. No. 11/938,082, mailed Dec. 28, 2009.
U.S. Appl. No. 12/044,744, Office Action mailed Dec. 30, 2011, 17 pgs.
U.S. Appl. No. 11/957,010, Office Action mailed Jan. 27, 2012, 25 pgs.
U.S. Appl. No. 12/276,874, Amendment and Response filed Jan. 26, 2012, 13 pgs.
Adkins et al.; GSS Collaboration in Document Development: Using Group Writer to Improve the Process, Proceedings of the 32nd Hawaii International Conference on System Sciences, Copyright © 1999 IEEE, 11 pages.
International Search Report and Written Opinion for PCT/US2009/039316, mailed Jan. 18, 2010, 11 pages.
US Non-Final Office Action for U.S. Appl. No. 11/951,973 mailed Jan. 19, 2011.
Ohst et al., Difference Tools for Analysis and Design Documents, IEEE 2003, pp. 1-10.
Lu et al., Merging Retrieval Results in Hierarchical Peer-to-Peer Networks, ACM 2004, pp. 472-473.
Heckel, A Technique for Isolating Differences between Files, ACM 1978, pp. 264-268.
U.S. Appl. No. 12/111,174, Amendment and Response filed Feb. 21, 2012, 9 pgs.
International Search Report and Written Opinion for PCT/US2008/083862 / MS321998.02 mailed Mar. 31, 2009, 11 pages.
Synchronous Collaborative Text Document Editing Online: MoonEdit, reviewed Sep. 13, 2007, pp. 104, http://www.masternewmedia.org/news/2005/02/20/synchronous_collaborative_text_document-editing.htm.
US Office Action (Non-Final) for U.S. Appl. No. 11/957,010, mailed Mar. 18, 2010, 32 pages.
US Non-Final Office Action for U.S. Appl. No. 12/044,744, mailed Mar. 25, 2011.
"File Locks-GNU Emacs Lisp Reference Manual"; www.gnu.org/software/emacs/elisp/html_node/File-Locks.html; Mar. 28, 2006; 2 pages.
Miller et al.; "Interactive Simultaneous Editing of Multiple Text Regions"; www.co-ode.org/resources/papers/k-cap2007-seidenberg.pdf; Jun. 2001; 15 pages.
Seidenberg et al; "A Methodology for Asynchronous MultiUser Editing of Semantic Web Ontologies"; www.xmpp.org/extensions/xep-0058.html; Mar. 28, 2006; 8 pages.
Shchepin; "XEP-0058: Multi-User Text Editing"; http://groups.csail.mit.edu/uid/projects/simuledit/usenix01.pdf; Oct. 9, 2007; 5 pages.
US Final Office Action for U.S. Appl. No. 12/145,536 mailed Apr. 26, 2011.
"Codeville," http://codeville.org/, 2 pages (Date Retrieved Oct. 9, 2007).
"Google, Google Docs & Spreadsheets Tour" downloaded from http://www.google.com/google-d-s/intl/en/tour2.html on Nov. 9, 2007 (1 page).
"Status of Software Reuse 577," http://www.plex86.org/Computer_Folklore/Status-of-Software-Reuse-577.html, 2 pages (Date Retrieved Oct. 9, 2007).

Adler et al., "Evaluating and Implementing a Collaborative Office Document System," 2005, pp. 1-18, http://www.sce.carleton.ca/faculty/adler/publications/2005/adler-nash-noel-2005-Collab-Office.pdf.
Citro et al., "Conflict Management for Real-Time Collaborative Editing in Mobile Replicated Architectures," School of Computer Science and Information Technology, RMIT University, Melbourne, Victoria, Australia, Australian Computer Society, Inc. © 2007, pp. 1-10, http://www.crpit.com/confpapers/CRPITV62Citro.pdf.
Galli, R., "Journal File Systems in Linux," http://bulma.net/impresion.phtml?nIdNoticia=1154, 15 pages (Jan. 24, 2002).
Green, Bob, "Converting Qedit to the Client/Server Model", http://www.robelle.com/library/papers/client-server/, 14 pages (Copyright 2004).
Haake et al., "Collaborative Authoring of Hypermedia Documents," Machine Translation Today, Translating and the Compute 15, pp. 41-58, Aslib:London 1993, pp. 1-18, http://www.pi6.fernuni-hagen.de/publ/MT-93.pdf.
Hebsgarrd, Poul J; Process Driven Document Management™, Version 6.1, Feb. 2007, pp. 1-13, http://www.brain-technology.com/upload/file_vk306c6tr779p9gntgho_16467.pdf.
Ignat et al., "Extending Real-Time Collaborative Editing Systems with Asynchronous Communication," Institute for Information Systems, ETH Zurich, (at least as early as Oct. 4, 2007) pp. 1-6, http://www.inf.ethz.ch/personal/ignat/Publications/cscwd_04.pdf.
Koch, Michael, "Design Issues and Model for a Distributed Multi-User Editor" (pp. 1-21), from *Computer Supported Cooperative Work, An International Journal*, 3(3-4), 19995, pp. 359-378.
La Fontaine, Robin, Monsell EDM Ltd., Merging XML Files: a new approach providing intelligent merge of XML data sets, Presented at XML Europe 2002, 21 pages, http://www.deltaxml.com/dxml/93/version/default/part/AttachmentData/data/merging-xml-files.pdf.
Microsoft Corporation, Compare and Merge Mechanisms, © 2007, 1 page, http://msdn2.microsoft.com/en-us/library/ek8hk7e2(VS.80,d=printer).aspx.
Pacull et al., "Duplex: A Distributed Collaborative Editing Environment in Large Scale" *Proceedings of the Conference on Computer Supported Cooperative Work*, Oct. 22-26, 1994, Chapel Hill, NC, USA. ACM, 1994; pp. 165-173.
Preston et al., "Synchronous Editing via Web Services: Combining Heterogeneous Client and Server Technologies," Department of Computer Science, Georgia State University, Atlanta, Georgia, *CSCW 2006*, Nov. 4-8, 2006, Banff, Alberta, Canada, pp. 1-2. http://cims.clayton.edu/jpreston/PhD/Research/Preston%20-%20CSCW%20Demo%20Extended%20Abstract.pdf.
Synchronous Collaborative Text Document Editing Online: MoonEdit, reviewed Sep. 13, 2007, pp. 1-4, http://www.masternewmedia.org/news/2005/02/20/synchronous_collaborative_text_document_editing.htm
Tichy, Walter F., RCS—A System for Version Control, Jan. 3, 1991, 20 pages, http://www.svlug.org/teams/rcs.pdf.
U.S. Appl. No. 11/938,082, filed Nov. 9, 2007, Confirmation No. 3133.
U.S. Appl. No. 11/951,973, filed Dec. 6, 2007, Confirmation No. 9364.
U.S. Appl. No. 11/957,010, filed Dec. 14, 2007, Confirmation No. 8535.
U.S. Appl. No. 12/044,744, filed Mar. 7, 2008, Confirmation No. 7862.
U.S. Appl. No. 12/111,174, filed Apr. 28, 2008, Confirmation No. 6839.
U.S. Appl. No. 12/117,025, filed May 8, 2008, Confirmation No. 8234.
Wilde, Erik, "Multi-User Multimedia Editing with the MultimETH System," Swiss Federal Institute of Technology, CH 8092, Zurich, (at least as early as Oct. 10, 2007) pp. 1-9, http://dret.net/netdret/docs/wilde-tikrep18.pdf.
US Final Office Action for U.S. Appl. No. 11/938,082 mailed Jun. 29, 2010.
Google, "Share and Collaborate in Real Time," 2008, 1 page, http://www.google.com/google-d-s/intl/en/tour2.html.

McKechan et al., "Design Considerations for Creditor: A Collaborative Report Writing Editor," 10 pages, accessed May 16, 2008, http://userpages.umbc.edu/~jcampbel/Group01/McKechan_paper_iwces3.pdf.
U.S. Appl. No. 12/145,536, filed Jun. 25, 2008, Bailor et al., Confirmation No. 3462, 20 pages.
International Preliminary Report and Written Opinion for PCT/US/2008/083069 / MS 321999.02 mailed Jun. 24, 2010, 6 pages.
International Search Report and Written Opinion for PCT/US2009/037920 mailed Nov. 30, 2009, 11 pages.
International Search Report and Written Opinion for PCT/US2009/045558 mailed Nov. 30, 2009, 11 pages.
Pacull et al., "Duplex: A Distributed Collaborative Editing Environment in Large Scale, "*Proceedings of the Conference on Computer Supported Cooperative Work*, Oct. 22-26, 1994, Chapel Hill, NC, USA. ACM, 1994; pp. 165-173.
US Non-Final Office Action for U.S. Appl. No. 11/957,010, mailed Mar. 18, 2010, 24 pgs.
US Non-Final Office Action for U.S. Appl. No. 12/111,174, mailed Jun. 8, 2011, 35 pgs.
US Notice of Allowance for U.S. Appl. No. 11/938,082, mailed Jan. 4, 2011, 18 pgs.
US Notice of Allowance for U.S. Appl. No. 12/117,025, mailed Apr. 14, 2011, 10 pgs.
U.S. Appl. No. 12/117,025, Amendment and Response filed Dec. 21, 2010, 17 pgs.
U.S. Appl. No. 12/117,025, Notice of Allowance mailed Jul. 21, 2011, 10 pgs.
U.S. Appl. No. 12/145,536, Amendment and Response filed Feb. 8, 2011, 18 pgs.
U.S. Appl. No. 12/145,536, Amendment and Response filed Jul. 26, 2011, 19 pgs.
U.S. Appl. No. 12/145,536, Office Action mailed Aug. 1, 2011, 37 pgs.
U.S. Appl. No. 11/938,082, Amendment and Response filed Mar. 25, 2010, 15 pgs.
U.S. Appl. No. 11/938,082, Amendment and Response filed Aug. 4, 2010, 14 pgs.
U.S. Appl. No. 11/951,973, Amendment and Response filed Apr. 13, 2011, 11 pgs.
U.S. Appl. No. 11/957,010, Amendment and Response filed Jun. 2, 2010, 12 pgs.
U.S. Appl. No. 11/957,010, Amendment and Response filed Nov. 17, 2010, 11 pgs.
U.S. Appl. No. 12/044,744, Amendment and Response filed Oct. 26, 2010, 11 pgs.
U.S. Appl. No. 12/044,744, Amendment and Response filed Dec. 2, 2011, 11 pgs.
U.S. Appl. No. 12/044,744, Amendment and Response filed Jun. 24, 2011, 11 pgs.
US Final Office Action for U.S. Appl. No. 11/957,010 mailed Aug. 18, 2010.
US Non-Final Office Action for U.S. Appl. No. 12/117,025 mailed Sep. 21, 2010.
Appleton, Brad, "ClearView: Associating Attributes and Notes With a View", ClearCase International User's Group Conference, Sep. 1996, 16 pgs.
Byfield, Bruce, "Ooo Off the Wall: That's Your Version—Document Control in Ooo Writer", published on Linux Journal, Mar. 7, 2006, 6 pgs.
Immedius, Inc., "S1000Dmanager v 3.0", Comprehensive S1000D Project Setup and Management Support, found online on Aug. 22, 2008 at: http://www.immediuss1000d.com/c_manager/S1Dmanager_overview.html, 6 pgs.
International Search Report for PCT/US2009/062364 dated May 31, 2010, 11 pgs.
Samiei et al., "EzMail: Using Information Vizualization Techniques to Help Manage Email", Proceedings of the 8th National Conference on Information Vizualization, 2004, 6 pgs.
U.S. Appl. No. 11/951,973, Notice of Allowance mailed Jun. 21, 2011, 9 pgs.
U.S. Appl. No. 11/957,010, Office Action mailed Aug. 17, 2011, 26 pgs.
U.S. Appl. No. 12/044,744, Final Office Action mailed Aug. 30, 2011, 17 pgs.
U.S. Appl. No. 12/111,174, Amendment and Response mailed Sep. 8, 2011, 11 pgs.
U.S. Appl. No. 12/117,025, Notice of Allowance mailed Sep. 15, 2011, 9 pgs.
U.S. Appl. No. 12/276,874, Amendment and Response filed Jun. 22, 2011, 17 pgs.
U.S. Appl. No. 12/276,874, Final Office Action mailed Aug. 3, 2011, 15 pgs.
U.S. Appl. No. 12/276,874, Office Action mailed Feb. 22, 2011, 15 pgs.
Venolia, Gina et al., "Understanding Sequence and Reply Relationships Within Email Conversations: A Mixed-Model Vizualization", Apr. 2003, Proceedings of the SIGCHI Conference on Human Factors in Computing Systems, Ft. Lauderdale, FL, USA, Apr. 5-10, 2003, 8 pgs.
Williams, Tim, "Version Control on the Cheap: A User-Friendly, Cost-Effective Revision Control System for SAS", 10 pgs., no date.
ZEND Corporation, the PHP Company, "Team Development With Zend Studio for Eclipse", White Paper, Jan. 2008, 17 pgs.
US Non-Final Office Action for U.S. Appl. No. 12/145,536 mailed Nov. 8, 2010.
Chinese 1st Office Action in Application 200880121295.0, mailed Jan. 18, 2012, 6 pgs.
Taiwan Intellectual Property Office Official Letter dated Feb. 14, 2012; cited in Taiwan Patent Application No. 97142418; 13 pages.
European Extended Search Report cited in Application No. 09767155.6; dated Mar. 26, 2012; 10 pages.
Dekeyers, Stijin and Hidders, Jan, "Path Locks for XML Document Collaboration," University of Antwerp; Dec. 12, 2002; pp. 105-114.
Ellis et al., "Groupware—Some Issues and Experiences," vol. 34, No. 1, Jan. 1, 1991; pp. 38-58.
Shepler et al., "Network File 1-15 System (NFS)," Version 4, Apr. 1, 2003; retrieved from http://rsync.tools.ietf.org/html/rfc3530 on Mar. 7, 2012; 275 pages.
Tanebaum, Andrew S., "Moderne Betriebssysteme", 2003 Pearson; pp. 786-787.
Chinese Patent Office Notice on First Office Action cited in Application No. 200980115758.7; dated Mar. 28, 2012 (in Chinese with English translation); 10 pages.
"Perforce software Delivers Improved Performance to its Fast Software Configuration Management System," Perforce Software, Jul. 9, 2007, 2 pages.
"Technical Overview," Apache CouchDB, The Apache Software Foundation, © 2008, 7 pages.
Badouel, Eric et al., "Merging Hierarchically-Structured Documents in Workflow Systems", Electronic Notes in Theoretical Computer Science 203, (2008), 3-24.
Chinese 2nd Office Action in Application 200880115943.1, mailed Jun. 1, 2012, 7 pgs.
Feise, Joachim; "A Survey of Distributed Hypermedia Systems," ISR Institute for Software Research, University of California, Irvine, Apr. 2005, 39 pages.
Mendoza et al., "A Flexible Distribution Service for a Co-authoring Environment on the Web," IEEE Computer Society, Proceedings of Sixth Mexican International Conference on Computer Science (ENC '05) © 2005, 8 pages.
PCT International Search Report and Written Opinion in Application PCT/US2010/032309, mailed Dec. 1, 2010, 9 pgs.
Russian Notice of Allowance in Application 2010123793, mailed Apr. 13, 2012, 7 pgs.
U.S. Appl. No. 12/044,744, Notice of Allowance mailed May 7, 2012, 12 pgs.
U.S. Appl. No. 12/111,174, Notice of Allowance mailed Apr. 12, 2012, 11 pgs.
U.S. Appl. No. 12/145,536, Office Action mailed Mar. 12, 2012, 52 pgs.
U.S. Appl. No. 12/276,874, Office Action mailed Apr. 26, 2012, 20 pgs.
U.S. Appl. No. 12/432,817, Amendment and Response filed Dec. 12, 2011, 15 pgs.

U.S. Appl. No. 12/432,817, Amendment and Response filed Apr. 25, 2012, 11 pgs.
U.S. Appl. No. 12/432,817, Notice of Allowance mailed May 2, 2012, 6 pgs.
U.S. Appl. No. 12/432,817, Office Action mailed Jan. 25, 2012, 27 pgs.
U.S. Appl. No. 12/432,817, Office Action mailed Sep. 12, 2011, 25 pgs.
U.S. Appl. No. 13/079,605, Amendment and Response filed Feb. 28, 2012, 12 pgs.
U.S. Appl. No. 13/079,605, Notice of Allowance mailed Apr. 20, 2012, 9 pgs.
U.S. Appl. No. 12/044,744, Amendment and Response filed Mar. 30, 2012, 11 pgs.
US Final Office Action for U.S. Appl. No. 12/044,744 mailed Nov. 22, 2010.
Amendment and Response to Final Office Action cited in U.S. Appl. No. 11/957,010, filed Apr. 9, 2012; 12 pages.
Australian Office Action in Application 2008324973, mailed Jul. 4, 2012, 3 pgs.
Grover, Chris, "Word 2007: The Missing Manual", Pogue Press, Copyright 2007, pp. 380-388.
Murray, Katherine et al., "Compare and Combine Documents in Word 2007", Microsoft Office Word 2007 Inside Out, obtained online on Jul. 11, 2012 at: http://office.microsoft.com/en-us/word-help/compare-and-combine-documents-in-word-2007-HA010234132.aspx, 2012 Microsoft Corporation, 5 pgs.
Tyson, Herb, "Microsoft Word 2007 Bible", Wiley Publishing Company, Inc. 2007, Indianapolis, IN, USA, pp. 807-808.
U.S. Appl. No. 12/044,744, Notice of Allowance mailed Jun. 21, 2012, 8 pgs.
U.S. Appl. No. 13/079,605, Notice of Allowance mailed Jun. 28, 2012, 9 pgs.
"How to Track and Manage Changes in a Word 2002 and a Word 2003 Document," Microsoft Corporation, Mar. 8, 2007, 4 pages.
"Track Changes in Word 2007 Tutorial," Florida Gulf Coast University, copyright 2007, 2 pages.
Jalbert, Peter, "Real Time Collaboration with Google Docs and Spreadsheets," Jan. 23, 2008, 5 pages.
Willden, Andrew, "Track Changes in Word 2007," Fall 2007, 2 pages.
U.S. Appl. No. 12/111,174, Notice of Allowance mailed Aug. 29, 2012, 11 pgs.
U.S. Appl. No. 12/145,536, Amendment and Response filed Sep. 11, 2012, 22 pgs.
Chinese 1st Office Action in Application 201080019470.2, mailed Aug. 31, 2012, 7 pgs.
Australian Notice of Acceptance in Application 2008324973, mailed Aug. 22, 2012. 3 pgs.
Chinese 3rd Office Action in Application 200880115943.1, mailed Aug. 30, 2012, 6 pgs.
Taiwanese Notice of Allowance in Application 97142418, mailed Aug. 16, 2012, 4 pgs.
Australian Office Action in Application 2008335565, mailed Aug. 30, 201, 3 pgs.
Chinese 2nd Office Action in Application 200880119647.9, mailed Aug. 13, 2012, 6 pgs.
Australian Notice of Allowance in Application 2008335565, mailed Sep. 18, 2012, 3 pgs.
Chinese 1st Office Action in Application 200980116872.1, mailed Oct. 9, 2012, 14 pgs.
Chinese 1st Office Action in Application 200980124935.8, mailed Oct. 30, 2012, 10 pgs.
Chinese 2nd Office Action in Application 200880121295.0, mailed Oct. 23, 2012, 10 pgs.
European Examination Report in Application 09739350.8, mailed Sep. 25, 2012, 7 pgs.
Tanenbaum, Andrew S., "Modern Operating Systems", 2nd Edition, Prentice Hall, New Jersey, 2001, pp. 735-737.
U.S. Appl. No. 13/079,605, Notice of Allowance mailed Oct. 22, 2012, 9 pgs.
U.S. Appl. No. 13/539,473, Office Action mailed Oct. 11, 2012, 23 pgs.
U.S. Appl. No. 12/117,025, Office Action mailed Oct. 31, 2012, 11 pgs.
U.S. Appl. No. 12/111,174, Notice of Allowance mailed Nov. 19, 2012, 2 pgs.
U.S. Appl. No. 12/432,817, Notice of Allowance mailed Aug. 6, 2012, 5 pgs.
U.S. Appl. No. 12/276,874, Office Action mailed Sep. 27, 2012, 22 pgs.
U.S. Appl. No. 13/079,605, Notice of Allowance mailed Nov. 19, 2012, 2 pgs.
U.S. Appl. No. 13/495,659, Office Action mailed Nov. 21, 2012, 7 pgs.
U.S. Appl. No. 13/079,605, Notice of Allowance mailed Dec. 5, 2012, 2 pgs.
U.S. Appl. No. 12/111,174, Notice of Allowance mailed Dec. 4, 2012, 2 pgs.
U.S. Appl. No. 12/145,536, Notice of Allowance mailed Nov. 23, 2012, 18 pgs.
Russian Notice of Allowance in Application 2010122968, mailed Nov. 6, 2012, 27 pgs.
Australian Office Action in Application 2008338826, mailed Oct. 24, 2012, 3 pgs.
Chinese 2nd Office Action in Application 200980115758.7, mailed Dec. 5, 2012, 7 pgs.
Chinese 1st Office Action in Application 200980147769.3, mailed Nov. 29, 2012, 12 pgs.
U.S. Appl. No. 13/539,473, Amendment and Response filed Jan. 11, 2013, 15 pgs.
U.S. Appl. No. 12/276,874, Amendment and Response filed Dec. 27, 2012, 14 pgs.
U.S. Appl. No. 12/117,025, Amendment and Response filed Jan. 30, 2013, 13 pgs.
Australian Notice of Allowance in Application 2008338826, mailed Dec. 5, 2012, 2 pgs.
Japanese Notice of Rejection mailed Dec. 28, 2012, in Application No. 2010-533160 (8 pages).
Chinese Notice on the Second Office Action mailed Mar. 1, 2013, in Application No. 201080019470.2 (6 pages).

* cited by examiner

CONTROLLING ACCESS TO DOCUMENTS USING FILE LOCKS

BACKGROUND

It is often desirable to allow multiple users to coauthor a document file. However, not all software applications support coauthoring. Often, one version of a software application, typically a newer one, may permit coauthoring, and a legacy version of the software application may not. It is desirable to provide a degree of backward compatibility in a coauthoring system to ensure that newer software applications can share access to a document file, that legacy software applications can also access the document file, and that legacy applications do not inadvertently disrupt coauthoring data or the coauthoring process.

SUMMARY

The present disclosure relates to systems and methods for controlling access to document files stored on a server.

According to one aspect, a system for controlling access to document files on a document server includes one or more document files stored on a document server, at least one of the document files referencing a file lock stored on the document server, and a document access processing module. The document access processing module includes a file sharing processing module that determines a coauthoring status of a software application of a client computer requesting access to the document file, and a file lock processing module that stores one or more file locks and that controls the setting and resetting of file locks. The document access processing module uses the coauthoring status of the software application and the file lock status of a document file to determine whether a software application is permitted to have write access to the document file.

According to another aspect, a method for controlling access to document files includes: receiving a request from a software application to access a document file on a server; determining a coauthoring status of the software application; determining a file lock status of the document file; permitting write access to the document file if the software application supports coauthoring and the file lock status permits coauthoring; and denying write access to the document file if the file lock status permits coauthoring but the software application does not permit coauthoring.

According to yet another aspect, a method for controlling access to document files stored on a document server includes: receiving a request at a document server to set a lock that designates a document file for shared access, the request being made when the document file is closed, and the request being made independently of a request by a software application to access the document file; setting a first lock for the document file, the first lock preventing software applications that do not support coauthoring from writing to the document file; receiving a request from a first software application to access the document file; determining whether the first software application permits coauthoring; permitting write-access to the document file if the first software application permits coauthoring; setting a second lock for the document file if the first software application permits coauthoring, the second lock permitting additional software applications that support coauthoring to have write-access to the document file; and denying write-access to the document file if the first software application does not permit coauthoring.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description serve to explain the principles of the disclosure. In the drawings.

DETAILED DESCRIPTION

The present application is directed to systems and methods for controlling access to document files. In examples described herein, the systems and methods use file locks referenced by the document file to determine if and when coauthoring permission should be granted. The system sets and resets the file locks as appropriate based on access requests for the document file by software applications that support coauthoring and by specific user actions that request a coauthoring file lock. In addition, the systems and methods use the file locks to permit legacy applications that do not support coauthoring to access the document file.

As used herein, the term "coauthoring" refers to the ability of multiple users to simultaneously edit a document file. As used herein, the term "document file" refers to a self-contained piece of work created with an application program.

A document file can be any file that can be accessed by a software application on a client. For example, a document file can be a file created using a word processing application such as Microsoft Word, a spreadsheet document created using a spreadsheet application such as the EXCEL® spreadsheet software from Microsoft Corporation, or a presentation document created using a presentation application such as the POWERPOINT® presentation graphics program from Microsoft Corporation. As such, a document file can include lists, tables, graphics objects, etc. These are examples only and other types of document files can be used.

Figure 1:
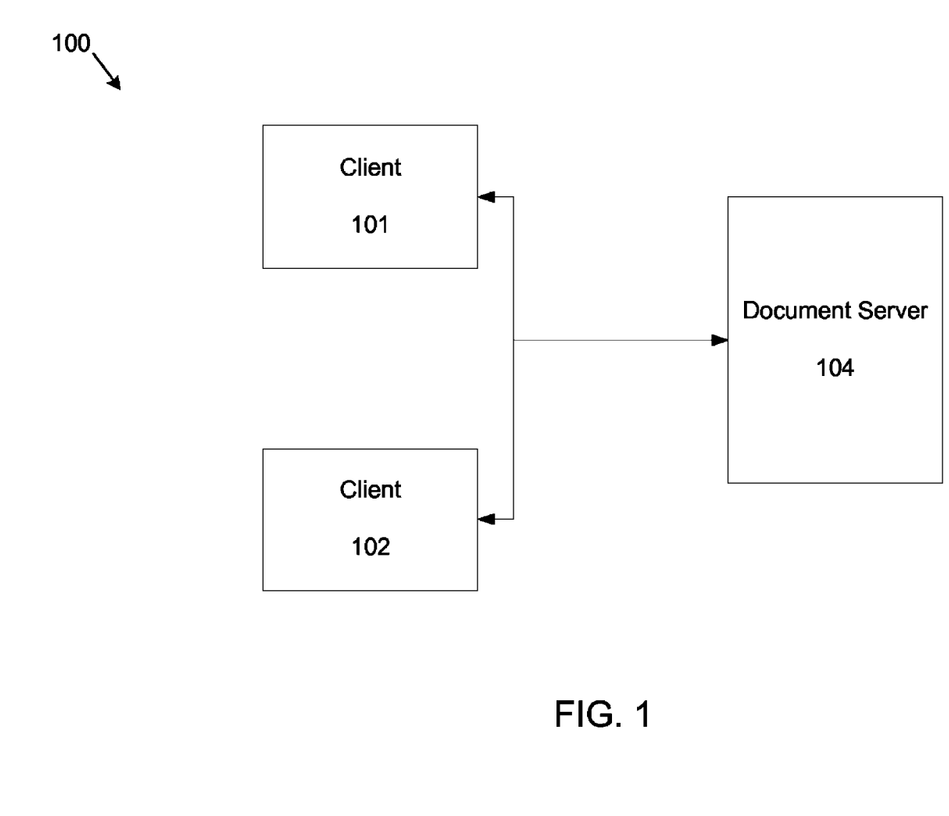
FIG. 1 shows an example system for controlling access to document files.

FIG. 1 shows an example system 100 that supports coauthoring of document files. The system includes clients 101, 102 and one or more document servers 104. More or fewer clients and document servers can be used.

The clients 101, 102 include software applications, for example word processing programs, that are used to create and edit document files. In example embodiments, the clients 101, 102 are a computing device, such as a desktop computer, laptop computer, personal data assistant, or cellular device. The client 102 can include input/output devices, a central processing unit ("CPU"), a data storage device, and a network device. Typical input/output devices include keyboards, mice, displays, microphones, speakers, disk drives, CD-ROM drives, and flash drives. Computer readable media, such as the data storage device, provide for data retention. By way of example, computer readable media can include computer storage media and communication media. Computer storage media includes volatile and nonvolatile, removable and non-removable media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Among the plurality of information stored on the data storage device is a client operating system ("OS") and client applications. The client OS is a program that manages the hardware and software resources of the client system. The client applications utilize the resources of the clients 101, 102 to directly perform tasks specified by the user. The network device enables the clients 101, 102 to send and receive data to/from the server 104. Other configurations for the clients 101, 102 are possible.

The document server 104 is a file server that is accessible in a network such as a LAN or the Internet. The document server 104 stores a plurality of files. These files can include both software application files and document files, as described further herein. The document server 104 controls access to the document files it stores. In example embodiments, the document server 104 can be located within an organization or can be part of an Internet-based shared document system. An example Internet-based shared document system is a SHAREPOINT® team services portal server services provided by Microsoft Corporation of Redmond, Wash. An example shared document server is Microsoft Office Share-Point Server 2007 provided by Microsoft Corporation of Redmond, Wash. Other configurations can be used.

Figure 2:
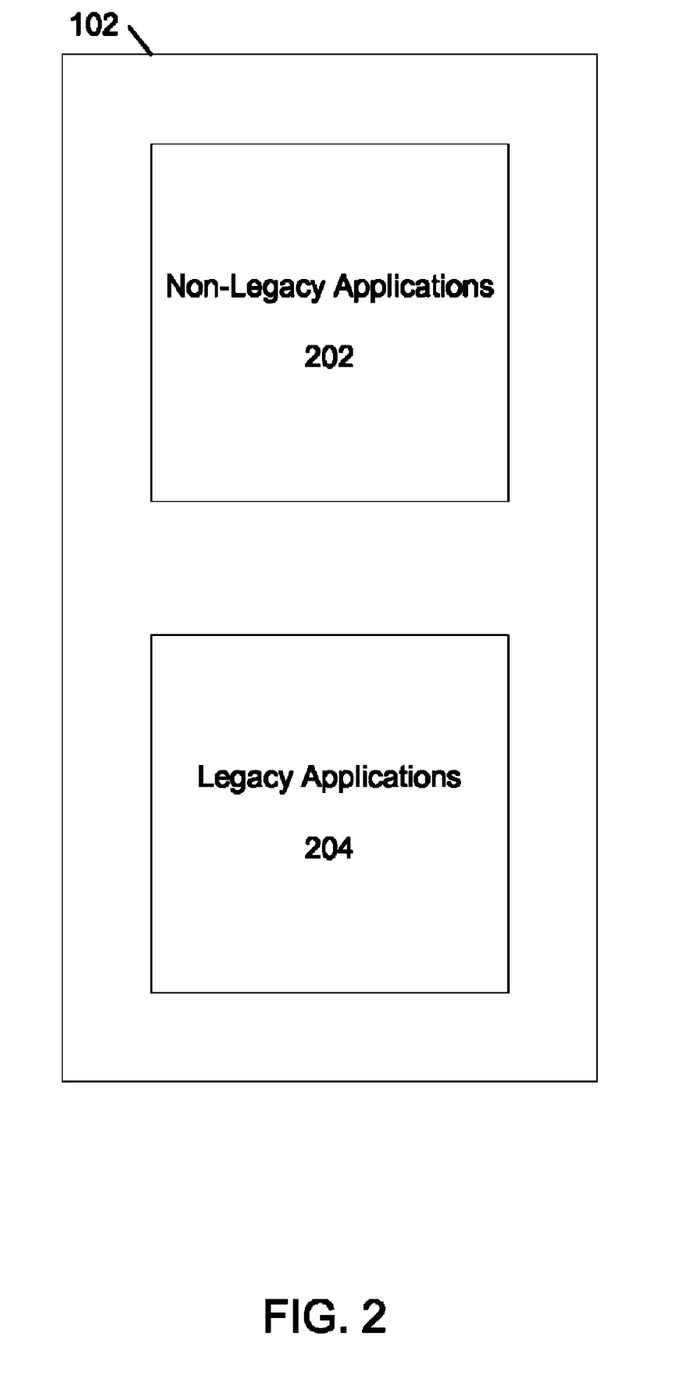
FIG. 2 shows an example client that includes both legacy and non-legacy applications.

FIG. 2 shows the example client 102 in more detail. The client 102 includes both non-legacy applications 202 that support coauthoring and legacy applications 204 that do not support coauthoring. For example, a new version of a word processing program, for example Microsoft Word provided by Microsoft Corporation of Redmond, Wash., may include functionality that permits multiple users to simultaneously open document files, edit those document files, and seamlessly merge the shared results. A previous version of the word processing program may not include all of this functionality. For example, a legacy application may allow only single users to open and edit document files at one time. However, both the new version and the legacy version may have a need to access the same document files from the document server 104.

Figure 3:
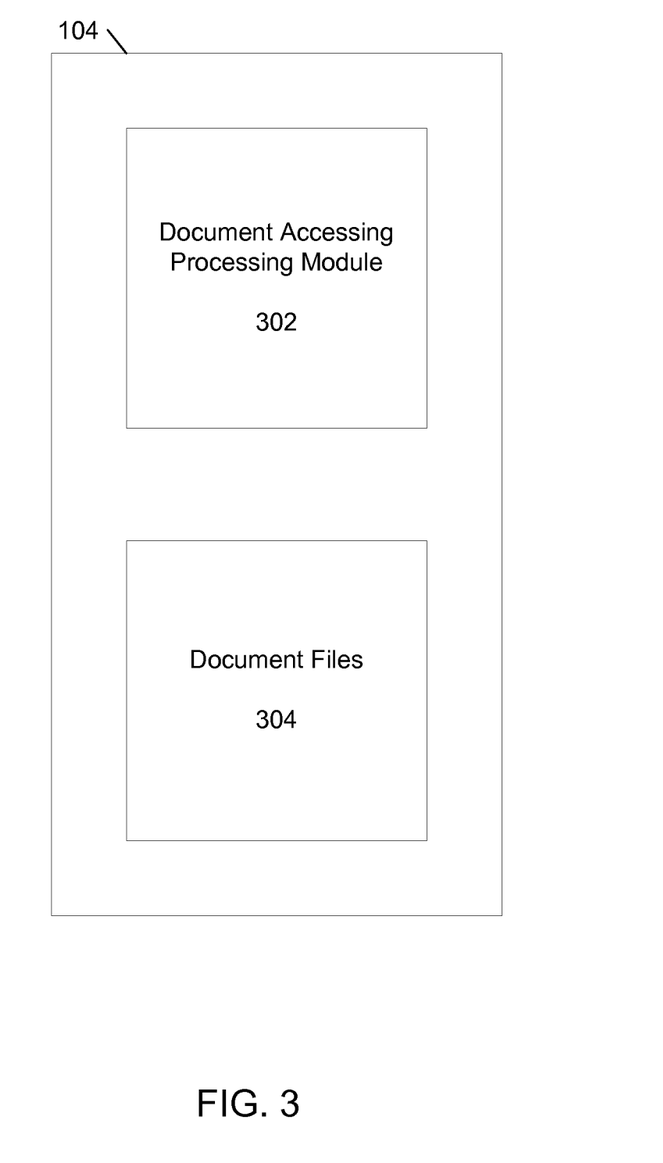
FIG. 3 shows an example document server that includes a document access processing module and document files.

FIG. 3 shows the example document server 104 in more detail. The document server 104 includes an example document access processing module 302 and document files 304.

The example document access processing module 302 controls the access to the document files 304. For example, the document access processing module 203 can determine whether a software application can open and edit a file with full read-write access, can open a file with read-only access, or cannot have any access to the file. The example document access processing module 302 also determines whether a software application may share a document file with other software applications that have permission to coauthor the document file.

Figure 4:
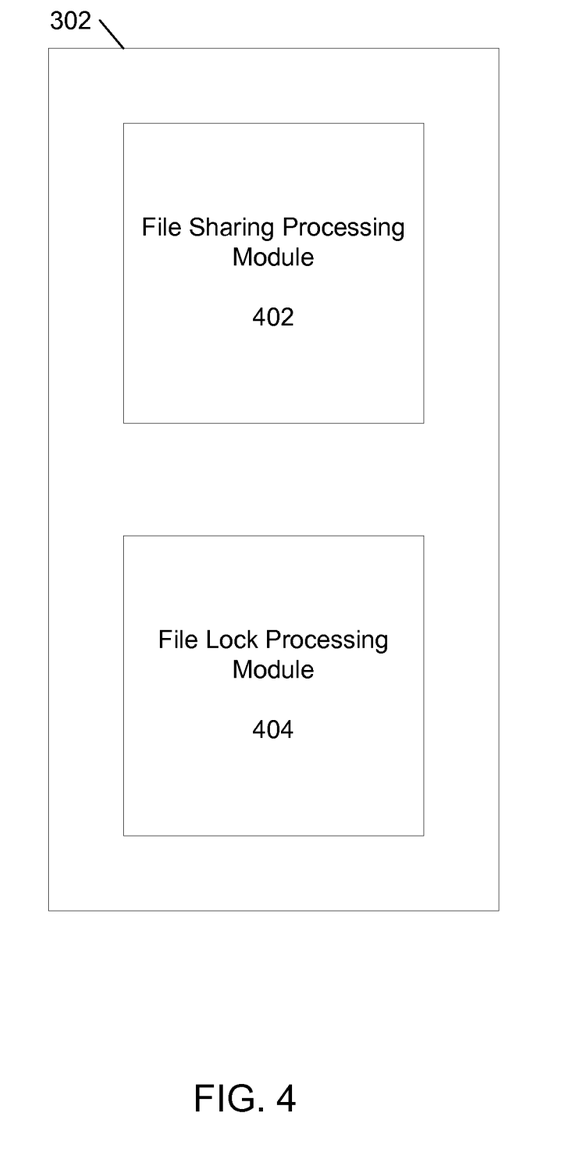
FIG. 4 shows an example document access processing module that includes a file sharing processing module and a file lock processing module.

Referring now to FIG. 4, the example document access processing module 302 includes a file sharing processing module 402 and a file lock processing module 404.

The example file sharing processing module 402 determines if a software application supports coauthoring. The example file sharing processing module 402 also determines whether a document file being accessed by a software application supports coauthoring. The determination of whether a document file supports coauthoring is typically made by evaluating the meta data associated with the document file. For example, in one embodiment, the meta data associated with each document file includes a field that indicates whether or not the particular file supports coauthoring.

The example file lock processing module 404 controls the setting, resetting, and processing of file locks stored on the document server. A file lock is used to control write access to the document file. The file lock is typically stored in meta data and referenced by the document file. In some embodiments, file lock meta data may be stored in a database on the document server. In other embodiments, file lock meta data may be stored in the document file. A document file may reference one or more file locks. The document access processing module 302 uses the coauthoring status of the software application and the file lock status of a document file to determine whether a software application is permitted have write access to the document file.

In examples described herein, the document access processing module 302 is programmed to process one or more different types of file locks. For example, in one embodiment, three example types of file locks are a short-term shared lock, a short-term exclusive lock, and a long-term shared lock.

An example short-term shared lock is set on the document server when a software application that supports coauthoring requests access to a document file. With a short-term shared lock, the software application has full read-write permissions to the file. If a second software application that also supports coauthoring requests access to the same document file, the second software application will also be granted full read-write permissions to the file and will be permitted to edit the file simultaneously with the first software application. Additional software applications that support coauthoring are also granted full read-write permissions to the file in the same manner. However, if a software application that does not support coauthoring requests access to a document file that has a short-term shared lock, the request for full read-write access is denied by the document access processing module 302 and the software application is only permitted read access to the document file.

An example short-term exclusive lock is set on the document server when a software application desires exclusive write access to a document file. A short-term exclusive lock can be granted for both software applications that support coauthoring and legacy applications that do not support coauthoring. The file lock processing module 404 sets a short-term exclusive lock when requested by a user and no other users have a short-term shared lock or a short-term exclusive lock for the document file. If a user requests a short-term exclusive lock and a short-term lock (either short-term shared or short-term exclusive) already exists for the document file, the request is denied. If the request is denied, the software application can view the document file on a read-only basis but cannot edit it. Once a short-term exclusive lock is set, if another user requests a short-term shared lock for coauthoring, that request is denied.

A short-term shared lock can also be transitioned into a short-term exclusive lock when a coauthoring client encounters a non-coauthorable feature in a document file, or when a user creates a non-coauthorable feature in an otherwise coauthorable document file. The determination of whether a feature is non-coauthorable is made by the software application. Typically, if a feature is not mergeable (i.e., the feature is not supported by the software application's merge engine) the feature is non-coauthorable. An example of a non-coauthorable feature is encrypted text.

A short-term shared lock and a short-term exclusive lock each have a timeout value associated with them. When the document file is accessed, either by reading or writing, the timeout value is refreshed. The example file lock mode processing module 404 resets the short-term shared lock when either the timeout value for the short-term shared lock is reached (due to inactivity on the document file) or when the document file is closed. Similarly, the example file lock processing module 404 resets the short-term exclusive lock when the timeout value for the short-term exclusive lock is reached, when the software application that requested the short-term exclusive lock closes or when the document file is closed. Other conditions for closing the short-term shared lock and the short-term exclusive lock are possible.

An example long-term shared lock is set for a document file when explicitly requested by a coauthoring user, typically via a user interface. There is no timeout value associated with a long-term shared lock but the long-term shared lock can be removed by an administrator of the document server 104 or can be removed by an explicit action of the user that requested the long-term shared lock.

When a long-term shared lock is set for a document file, the example file lock processing module 404 still sets a short-term shared lock on the document server when shared access to the file is requested by a coauthoring client. However, a legacy application that does not support coauthoring is denied full access to the document file and can only view the file in a read-only mode. The legacy application is denied full access to the document file even if the document file is not being edited and does not have a short-term shared lock. In addition, any request for exclusive rights to the file, such as by requesting a short-term exclusive lock, is denied, whether the request is made by a software application that supports coauthoring or by a legacy application that does not support coauthoring.

In alternative embodiments, other types of locks can also be used. For example, an embodiment may include a long-term exclusive lock. With a long-term exclusive lock, only one user can edit the file and there is no timeout value associated with the long-term exclusive lock.

Figure 5:
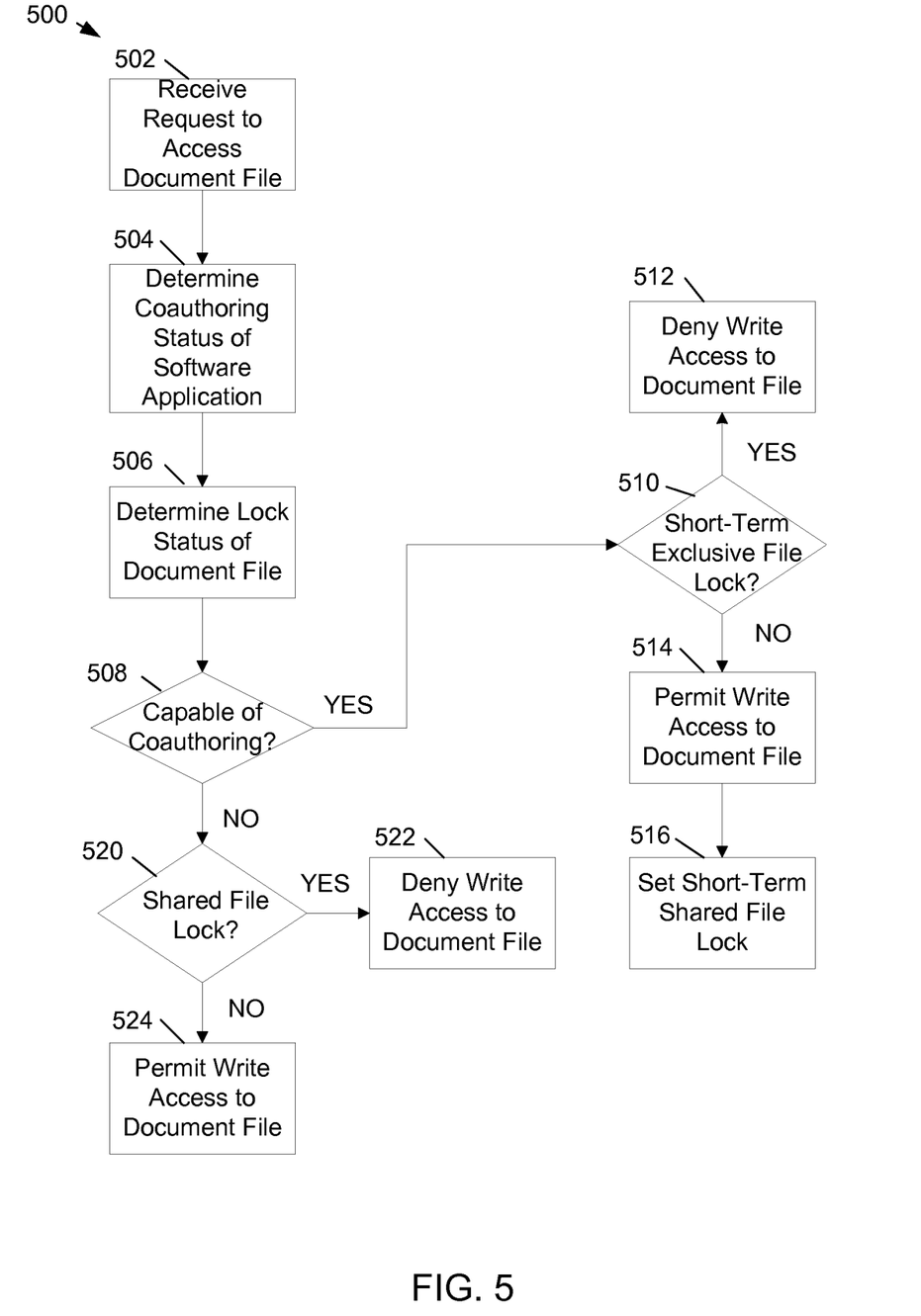
FIG. 5 shows an example method for controlling access to coauthorable server document files.

FIG. 5 is a flow chart showing an example method 500 for controlling access to server document files. At operation 502, a request to access a document file stored on a document server is received by the document server. The request is typically generated when a user of the software application at a client device attempts to open the document file with the software application. An example software application used for this purpose is a word processing program like Microsoft Word. The word processing program may be of a version that permits co-authoring of document files or it may be a legacy program that does not permit coauthoring. A determination of the coauthoring capabilities of the word processing program is made at operation 504.

The file lock status of the document file is determined at operation 506. The file lock is stored on the document server, typically via meta data and represents the coauthoring status of the document file. A plurality of file locks can be stored. Example file locks include 1) a short-term shared lock, representing that a software application that supports coauthoring has accessed the document file with the intent to write to it, typically by opening the document file in read-write mode, 2) a short-term exclusive lock, representing that a software application has exclusive access to the document file and 3) a long-term shared lock, representing that a user has made a specific request, typically via a user interface, to designate the document file as one available for file sharing. The request for the example long-term shared lock is an explicit request made independently from opening a document file. Other file locks are possible.

At operation 508, the software application is evaluated to determine if the software application is capable of coauthoring. If the software application permits coauthoring, control is passed to operation 510. At operation 510, if the file lock status indicates short-term exclusive access, meaning that the document file has been assigned exclusive access to another user, write access to the document file is denied at operation 512. In this case, the software application is permitted to view the document file on a read-only basis but is not permitted to edit the document file. If the file lock status does not indicate short-term exclusive access, at operation 514 the software application is permitted write access to the document file. In addition, if the file lock has not been set for shared status already, at operation 516, the file lock is set to short-term shared status.

Referring back to operation 508, if the software application does not support coauthoring, control is passed to operation 520 where the file lock status is evaluated to determine if there is a shared file lock. If there is a short-term shared lock, a short-term exclusive lock, or a long-term shared lock already set on the document file, the software application is denied write access to the document file at operation 522. If however, there is no short-term shared lock, short-term exclusive lock or long-term shared lock set on the document file, the software application is permitted write access to the document file at operation 524.

Figure 6:
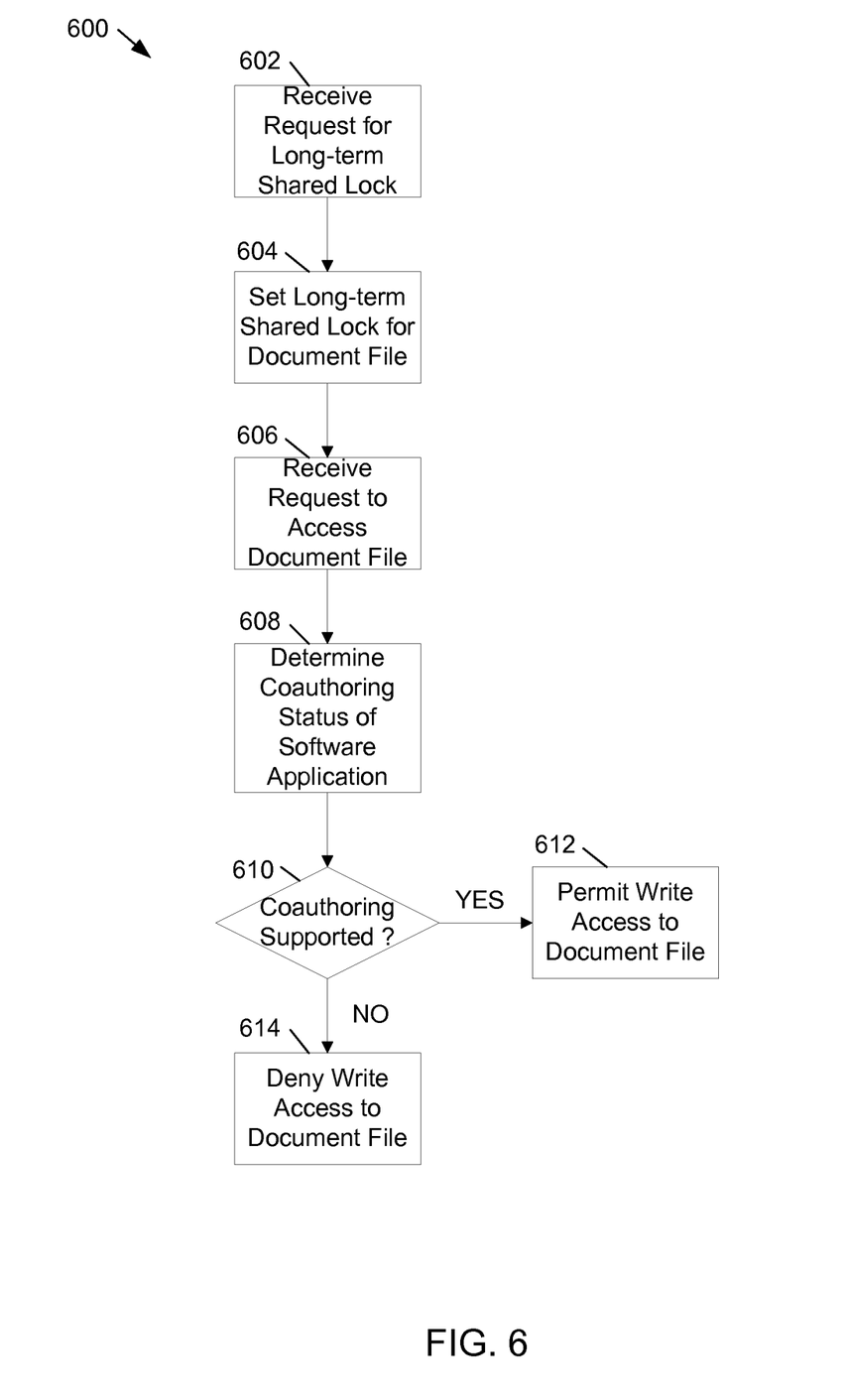
FIG. 6 shows another example method for controlling access to coauthorable server document files.

FIG. 6 is a flow chart showing another example method 600 for controlling access to server document files. In the example method 600, a long-term shared lock is used. Initially, at operation 602, a request is received at the document server to set a long-term shared lock for a document file. This request is initiated by a client, typically via a user interface on the client. At operation 604, the server sets a long-term shared lock on the document server for the document file. The long-term shared lock is used to set a shared coauthoring status on the document file independent of a software application attempting to access the document file. In this manner, when a software application does attempt to access the document file, a coauthoring status is already set for the document file.

At operation 606, a request is received from a software application to access the document file. At operation 608, the software application is checked to determine if the software application supports coauthoring. If coauthoring is supported at operation 610, write access is granted to the software application at operation 612. However, if coauthoring is not supported, because the document file has a long-term shared lock, the software application is denied write access to the document file and is only permitted to view the document file under read-only status. The long-term shared lock stays in effect until an explicit request is received at the server to reset the lock.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for controlling access to document files on a document server, the system comprising:
   one or more document files stored on a document server, at least one document file referencing a file lock stored on the document server, wherein the file lock comprises a first file lock that is a shared lock, and wherein the first file lock permits write-access to the at least one document file by a plurality of software applications; and
   a document access processing module, the document access processing module comprising:
      a file sharing processing module that determines a coauthoring status of a software application of a client computer requesting access to the document file, wherein the coauthoring status indicates whether the software application supports coauthoring; and
      a file lock processing module that stores a plurality of file locks, controls the setting and resetting of file locks, and determines a file lock status of the at least one document file, wherein the plurality of file locks comprises at least the first file lock and a second file lock that is an exclusive lock, wherein the second file lock permits exclusive write-access to the at least one document file by a single software application;
   wherein the document access processing module uses the coauthoring status of the software application and the file lock status of the at least one document file to determine whether the software application is permitted to have write-access to the at least one document file, and wherein the document access processing module resets the first file lock to the second file lock if the software application supports coauthoring and the at least one document file includes features that do not support coauthoring.

2. The system of claim 1, wherein the first file lock of the plurality of file locks represents that a software application that supports coauthoring has accessed the at least one document file.

3. The system of claim 2, wherein the first file lock has a timeout value.

4. The system of claim 3, wherein the document access processing module resets the first file lock when the timeout value is reached.

5. The system of claim 2, wherein the second file lock represents that a software application that supports coauthoring has exclusive write-access to the at least one document file.

6. The system of claim 5, wherein a third file lock represents that a specific request has been received to lock the at least one document file for shared access, the request being made when the document file is closed, and the request being made independently of a request by a software application to access the at least one document file.

7. The system of claim 6, wherein the document access processing module permits write-access to the at least one document file if the first file lock is set and one or more software applications that support coauthoring request access to the at least one document file.

8. The system of claim 7, wherein the document access processing module denies write-access to the at least one document file if the second file lock is set and one or more software applications that support coauthoring request access to the at least one document file.

9. The system of claim 8, wherein the document access processing module permits write-access to the at least one document file if the third file lock is set and one or more software applications that support coauthoring request access to the document file.

10. The system of claim 6, wherein the document access processing module denies write-access to the at least one document file if any of the first file lock, the second file lock and the third file lock is set and the software application does not support coauthoring.

11. The system of claim 1, wherein the second file lock represents that a software application that supports coauthoring has exclusive write-access to the at least one document file.

12. The system of claim 1, wherein a third file lock represents that a specific request has been received to lock the at least one document file for shared access, the request being made when the at least one document file is closed, and the request being made independently of a request by a software application to access the at least one document file.

13. The system of claim 12, wherein the document access processing module resets the third file lock upon an explicit request to reset the third file lock.

14. The system of claim 1, wherein the document access processing module only permits one software application to have write-access to the at least one document file if the at least one document file does not support coauthoring.

15. A method for controlling access to document files, the method comprising:
   receiving a request from a software application to access a document file on a server;
   determining a coauthoring status of the software application;
   determining a file lock status of the document file, wherein the file lock status comprises one of exclusive and shared, wherein a first file lock is a shared lock that permits write-access to the document file by a plurality of software applications, and wherein a second file lock is an exclusive lock that permits exclusive write-access to the at least one document file by a single software application;
   permitting write-access to the document file if the software application supports coauthoring and the file lock status permits coauthoring;
   denying write access to the document file if the software application supports coauthoring but the file lock status does not permit coauthoring; and
   setting the second file lock if the software application supports coauthoring and the at least one document file includes features that do not support coauthoring.

16. The method of claim 15, further comprising:
   receiving a request for exclusive access to the document file; and
   denying exclusive access to the document file if the file lock status of exclusive or shared has already been granted to another user.

17. A method for controlling access to document files stored on a document server, the method comprising:
   receiving a request at a document server to set a first file lock that designates a document file for shared access by a plurality of software applications, the request being made when the document file is closed, and the request being made independently of a request by a software application of the plurality of software applications to access the document file;
   setting the first file lock for the document file, the first file lock preventing software applications that do not support coauthoring from writing to the document file;

receiving a request from a first software application of the plurality of software applications to access the document file;

determining whether the first software application supports coauthoring;

permitting write-access to the document file if the first software application supports coauthoring;

setting a second lock for the document file if the first software application permits coauthoring, the second lock permitting additional software applications that support coauthoring to have write-access to the document file;

denying write-access to the document file if the first software application does not support coauthoring;

receiving a request from a second software application of the plurality of software applications to access the document file;

determining whether the second software application supports coauthoring;

permitting write-access to the document file if the second software application supports coauthoring; and denying write-access to the document file if the second software application does not support coauthoring.

18. The method of claim 17, further comprising:

receiving a request for exclusive access to the document file from the second software application, wherein the second software application supports coauthoring; and denying the request for exclusive access if the first file lock is set.

19. The method of claim 17, further comprising:

receiving a request for exclusive access to the document file from the second software application, wherein the second software application does not support coauthoring; and denying the request for exclusive access if the first file lock is set.

* * * * *